G. B. LAMPING AND J. A. DU LANEY.
SAND DISTRIBUTOR FOR MOTOR VEHICLES.
APPLICATION FILED MAY 9, 1921.
1,427,535.
Patented Aug. 29, 1922.
2 SHEETS—SHEET 1.
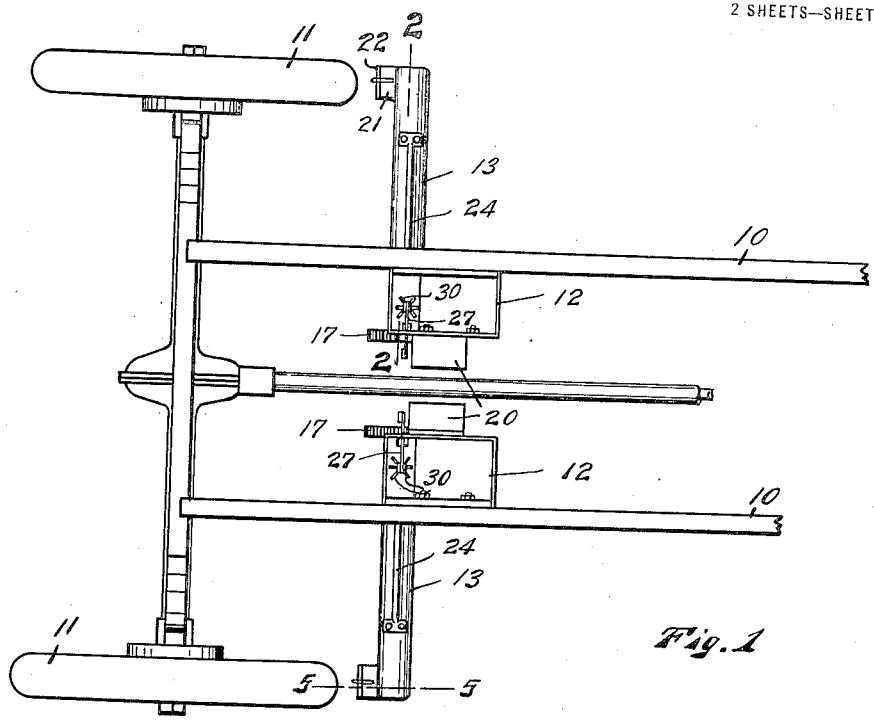
Fig. 1
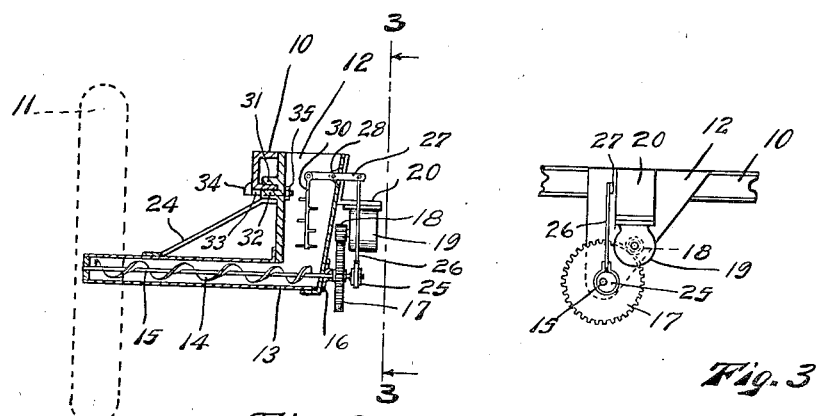
Fig. 2
Fig. 3
INVENTORS
George B Lamping
James A DuLaney
BY
Fred C Matheny
ATTORNEY

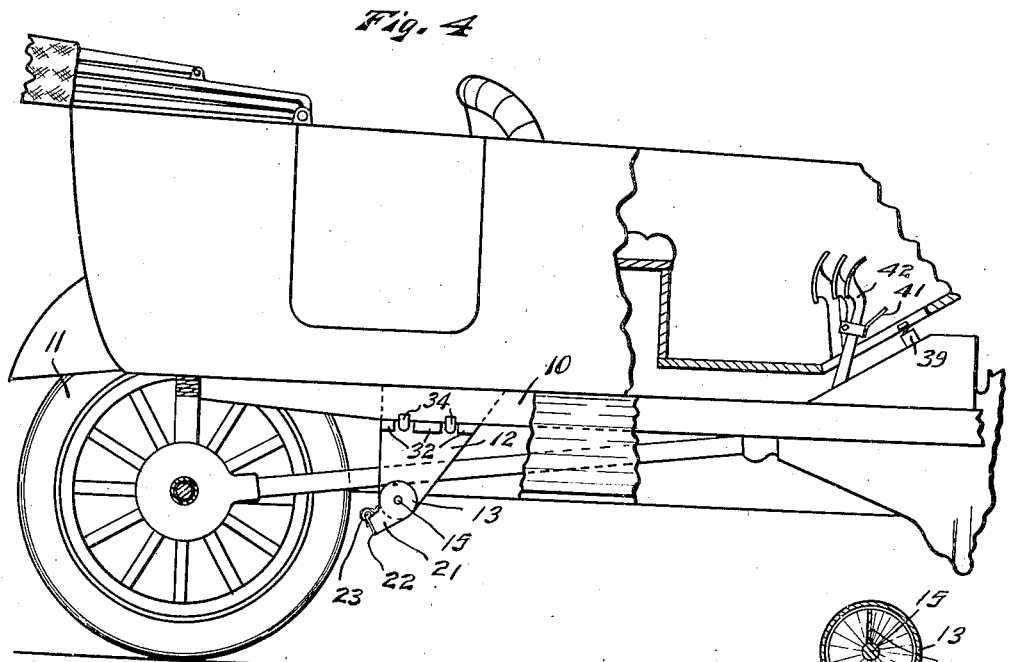
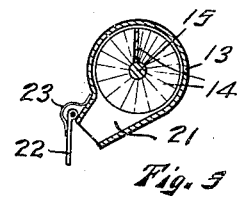
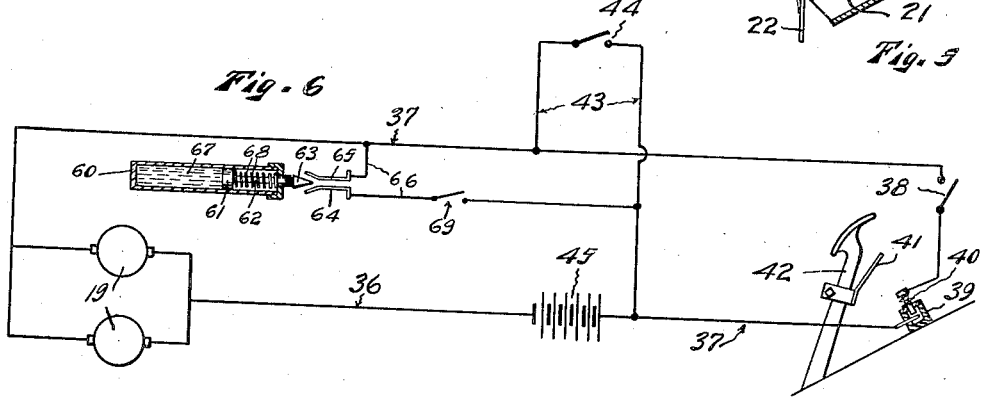
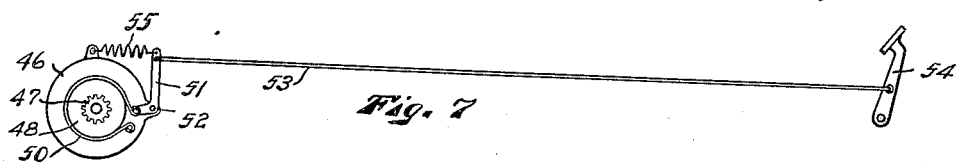

UNITED STATES PATENT OFFICE.

GEORGE B. LAMPING AND JAMES A. DU LANEY, OF SEATTLE, WASHINGTON.

SAND DISTRIBUTOR FOR MOTOR VEHICLES.

1,427,535. Specification of Letters Patent. Patented Aug. 29, 1922.

Application filed May 9, 1921. Serial No. 468,072.

*To all whom it may concern:*

Be it known that we, GEORGE B. LAMPING and JAMES A. DU LANEY, citizens of the United States, residing at Seattle, in the county of King and State of Washington, have invented a certain new and useful Improvement in Sand Distributors for Motor Vehicles, of which the following is a specification.

This invention relates to improvements in devices for preventing motor vehicles from skidding on slippery roads and pavements and the object of this improvement is to provide means for delivering sand onto the wheels of a motor vehicle or onto the roadbed in front of the wheels of such vehicle to increase the traction between the wheels and the roadbed and thereby prevent slipping and skidding of the wheels.

Another object is to provide apparatus of this nature including a worm or helicoidal conveyor for delivering sand from a hopper to the point at which it is discharged onto or under the wheels thereby insuring positive delivery of the sand even though such sand may have been damp and may have tended to pack within the hopper and delivery tubes of the apparatus.

A further object is to provide sand distributing apparatus of this nature that is simple in construction, reliable in operation, not expesive to manufacture and that may be readily applied to motor vehicles of various different standard types.

A further object is to provide automatic means for closing an electrical circuit and energizing the motors that drive the conveyor screws to thereby discharge sand momentarily in case the speed of the vehicle is suddenly and violently arrested.

A further object is to provide a sand distributing device having electrical actuating mechanism that may be quickly and easily connected with or disconnected from the brake mechanism of a motor vehicle in such a manner that when the brakes are applied an electric circuit will be closed and sand will be discharged from the sand discharging apparatus.

A still further object is to provide sand distributing apparatus of this nature in which either an electric motor or a spring motor may be used for driving the conveyor screw that discharges the sand.

With the above and other objects in view as will be apparent from the following description the invention consists in the novel construction, adaptation and combination of parts of a sand distributing apparatus for motor vehicles as will be more clearly hereinafter described and claimed.

In the accompanying drawings, Figure 1 is a plan view showing the rear end of an automobile chassis upon which this sand distributing apparatus is installed; Fig. 2 is a sectional view of the sand distributing apparatus substantially on a broken line 2, 2 of Fig. 1; Fig. 3 is a view in elevation of the sand hopper substantially on broken line 3, 3 of Fig. 2; Fig. 4 is a view in side elevation with parts broken away of a motor vehicle upon which this sand distributing apparatus is installed; Fig. 5 is an enlarged view in cross section substantially on a broken line 5, 5 of Fig. 1; Fig. 6 is a wire diagram showing the connections for the motors that drive the sand delivery screws and Fig. 7 is a somewhat diagrammatical view in elevation showing spring motor and releasable brake mechanism therefor which may be used instead of the electric motor shown and described in the preceding figures.

Like reference numerals designate like parts throughout the several views

Referring to the drawings, the numeral 10 designates the frame of an automobile chassis upon which this sand distributing apparatus is installed and 11 are wheels in front of which the sand is to be delivered.

Sand receptacles and apparatus for discharging the sand are provided in duplicate for each wheel to which the sand is to be delivered so that a description of one unit of the said apparatus will be applicable to any other unit.

The sand distributing apparatus proper comprises a hopper 12 arranged to be secured to the frame bars 10 and connected at its bottom end with a transversely arranged discharge tube 13 wherein is disposed a helicoidal conveyor screw 14. The screw 14 is preferably secured to a shaft 15 that projects outwardly through a bearing 16 in the side wall of the hopper 12 and that is provided externally of the hopper with a gear-wheel 17 that meshes with a pinion 18 on the shaft of an electric motor 19 that may be rigidly supported from the hopper 12 by means of a bracket 20 in such a manner that when the motor is driven the screw 14 will be rotated in the correct direction to discharge sand from the outer end of the tube 13.

The outer end of the tube 13 is provided with a discharge nozzle 21 that projects outwardly and downwardly therefrom as shown in Figs. 4 and 5 and that is arranged to deliver sand that is conveyed to the outer end of the tube by the screw 14 downwardly onto the roadbed or pavement directly in front of the wheels 11.

The discharge nozzle 21 is arranged to be closed by a swinging flap valve or door 22 that is held lightly in engagement with the end of such discharge nozzle by a spring 23. The flap valve 22 normally remains closed thereby preventing the entrance of mud, moisture and etc. into the nozzle 21 but such flap valve will be opened readily when sand is crowded outwardly into the nozzle 21 by rotation of the screw 14.

The outer end of the tube 13 may be supported by a bracket 24 or if desired such outer end may be secured to the foot board of the motor vehicle on which the apparatus is installed.

The inner end of the shaft 15 is provided with an eccentric 25 that is connected by a rod 26 with the outer end of a lever arm 27 that projects inwardly through the side of the hopper 12 and is fulcrumed on a pivot 28. The inner end of the lever arm 27 is connected with an agitator bar 30 that is arranged to be moved vertically within the hopper by rotation of the shaft 15 to prevent sand within the hopper from becoming packed so solidly that it will not feed down to the screw 14.

The outer side of the hopper 12 is preferably constructed of relatively heavy metal, see Fig. 2, that is provided with two externally disposed flanges 31 and 32 that are spaced apart far enough to fit over the lowermost flange of the channel frame member 10 and the hopper is rigidly secured to the frame member 10 by bolts 33 having heads 34 that hook over the outer edge of the channel bar 10 and that project through suitable holes in the side of the hopper 12 and are provided with nuts 35.

The construction described in the preceding paragraph makes it possible to secure the hopper 12 to the channel 10 that forms the side of the motor vehicle frame without drilling or boring the channel in any way and further provides rigid and substantial securing means that permit the hopper to be readily adjusted into various positions lengthwise of the frame.

The motor 19 on each hopper 12 is connected by a wire 36, see Fig. 6, with one terminal of a battery 45 and is connected by another wire 37 with the other terminal of the battery, the said wire 37 having a manually operated switch 38 and an automatically operated switch 39 interposed therein. The switch 39 is arranged so that it will be automatically closed by the same movement that applies the brake to the car. One way of accomplishing this result is to make the switch 39 in the form of a push button switch that is normally held in an open position by spring 40 and to secure the switch 39 in such a position that it will be engaged and closed by a flexible arm 41 on the brake pedal 42 of the motor vehicle when such brake pedal is depressed. The flexible arm 41 is preferably adjustably secured to the brake pedal and if desired may be adjusted so that it will only close the switch 39 when the brake pedal is depressed to its maximum position and the brakes are set tightly enough so that the wheels are liable to skid.

When the switch 38 is closed the flow of current to the motors will be controlled by the opening and closing of the switch 39 but when the switch 38 is open the brake pedal switch 39 will be rendered inoperative.

In addition to the switches above described the wire 37 is also preferably connected by wires 43 with a switch 44 that may be located on the steering wheel of the car or in any other convenient location and that serves as a means for controlling the flow of current to the motors 19 independently of the opening and closing of the switches 38 and 39.

The battery 45 will ordinarily be the source of supply of electrical current that is provided on the motor vehicle on which the apparatus is installed.

In addition to the circuit closing means above described I also provide an emergency circuit closing device that will act automatically in case the speed of the vehicle is suddenly checked. This device may comprise a cylinder 60 that is secured to the body of the vehicle in a horizontal position and is provided with a piston 61 having a piston rod 62 that projects outwardly through the forward end of the cylinder and is provided on its foremost extremity with a contact making device 63 that is arranged to bridge the gap between two switch terminals 64 and 65 that are connected by a shunt circuit 66 with the wire 37 in such a manner that when the terminals 64 and 65 are bridged the circuit to the motors may be closed even though the switches 38, 39 and 44 are all open.

The rear end of the cylinder 60 is filled with a heavy liquid as mercury designated by numeral 67 and a spring 68 is arranged to urge the piston 61 against the mercury with sufficient force to normally withdraw the contact member 63 from the switch terminals 64 and 65. If however the speed of the vehicle on which the device is carried is suddenly checked the momentum of the heavy mercury will drive the piston 61 forward against the force of the spring 68 and will project the contact member 63 between the terminals 64 and 65 thus closing the circuit to the motors 19. As soon as the effect of the sudden check in speed is passed the spring 68 will again move the piston 61 rearwardly and break the circuit. If desired a switch 69 may be provided for rendering the emergency circuit closing device inoperative.

The emergency circuit closing device will act if the emergency brake of a vehicle is suddenly set tight, or if the foot brake is set tight and hard when the switch 38 is open thereby causing sand to be discharged in time to prevent skidding of the vehicle.

If desired the electric motors 19 may be replaced by a spring motor 46 shown somewhat diagrammatically in Fig. 7 that has a pinion 47 that meshes with the gear wheel 17 and that has a brake drum 48 that is encircled and engaged by a brake band 50, one end of which is fixed and the other end of which is secured to the end of a bell crank arm 51 that is mounted on a pivot 52 and that is connected by a rod 53 with a pedal 54 that is located within easy reach of the driver of the motor vehicle. The upper end of the bell crank arm 51 is connected with a tension spring 55 that normally holds the brake band tight and prevents rotation of the brake drum 48 which is rigidly secured to the shaft of the spring motor. Pressure on the pedal 54 will overcome the tension of the spring 55, loosen the brake band 50 and permit operation of the spring motor 46.

The spring motor 46 may be of the usual construction and provided with the usual means by which it may be wound up.

The conveyor screws 14 insure a positive delivery of the sand regardless of whether such sand is wet or dry and also serve to prevent the sand from working out through the tubes 13 thereby eliminating the necesstiy of valves to cut off the discharge of sand.

In ordinary operation when the streets are wet and it is desired to use sand as a precaution each time the brakes are set the switch 38 is closed and allowed to remain closed so that each time the foot brake pedal 42 is depressed and the switch 39 closed the circuit to the motors 19 will be completed and the screws 14 controlling the discharge of sand will be rotated.

The switch 44 makes it possible to close the motor circuit voluntarily and without the operation of the foot brake pedal thus enabling the driver to discharge sand when the brakes are not set.

It is a well known fact that a motor vehicle will seldom skid except when the brakes are set. This fact has been borne in mind in the construction of this device and the actuating mechanism therefore has been arranged so that it may be adjusted in such a manner as to cause the sand to be delivered simultaneously with the setting of the brakes.

From the above description it will be seen that the device anticpates the skidding and prevents it by sanding the roadbed beforehand instead of seeking by the application of sand to stop a vehicle after it has started to skid.

It has also been found that good results may be obtained when the sand is delivered directly onto the tire of the vehicle and allowed to carry around with such tire instead of being delivered onto the roadbed in front of the vehicle wheel, the essential requirement being to get the sand on the roadbed at the point of contact with the tire. It may also be found advantageous to deliver sand onto or in front of the front wheels of a motor vehicle to prevent skidding.

From the foregoing description taken in connection with the accompanying drawings the advantages of the construction and of the method of operation of this device will be readily apparent to those skilled in the art to which the invention pertains and while we have described the principle of operation of the invention together with the device which we now consider to be the best embodiment thereof we desire to have it understood that the device shown is merely illustrative and that such changes may be made as are within the scope of the following claims.

What we claim is:

1. Sand distributing apparatus for motor vehicles comprising a sand receptacle, a tubular conduit extending outwardly from said sand receptacle to a point near a wheel of said vehicle, a conveyor screw in said conduit, a motor for rotating said screw and means arranged to be actuated by the application of the brakes of said vehicle for closing a circuit to said motor.

2. The combination with a motor vehicle, of a sand hopper carried thereon, conduits connected with said hopper for delivering sand between the roadbed and the wheels of said vehicle, rotary conveyor screws in said conduits, electrical mechanism for automatically rotating said conveyor screws simultaneously with the application of the brakes of said vehicle, and means for rendering said electrical mechanism inoperative.

3. A sander for motor vehicles comprising a sand receptacle, apparatus for discharging sand from said sand receptacle, electrical devices for actuating said sand discharging apparatus and means for automatically closing a circuit to said electrical devices in response to a sudden check in the speed of movement of said motor vehicle.

4. A sander for motor vehicles comprising sand receptacles, a tubular conduit extending outwardly from each of said sand receptacles, a rotary conveyor screw in each of said tubular conduits, motors for driving said conveyor screws, an electric circuit connected with said motors, a switch in said circuit, and means arranged to be actuated by a sudden check in the speed of movement of the vehicle to automatically close said switch.

5. Sand distributing apparatus for motor vehicles embodying a sand receptacle, conduits extending from said sand receptacle to points near the wheels of the vehicle, a conveyor screw in each conduit, electric motors for rotating said conveyor screws, a circuit controlling the flow of current to said motors, a normally open switch in said circuit and means connected with the brake pedal of the vehicle for closing the switch when the brake pedal is depressed beyond the normal limit of its movement.

6. Sand distributing apparatus for motor vehicles embodying a sand receptacle, conduits extending from said sand receptacle to points near the wheels of the vehicle, a conveyor screw mounted for rotation in each of said conduits, electric motors for rotating said conveyor screws, a lever arm mounted for oscillation on a fixed pivot, an agitator connected with one end of said lever arm and arranged to be moved within said sand receptacle by the oscillation of said lever arm, eccentric means connected with each of said conveyor screws and a link connecting the outer end of each of said lever arms with the corresponding eccentric means for oscillating the lever arm.

Signed at Seattle Wash. this 19 day of April 1921.

GEO. B. LAMPING.
JAMES A. DU LANEY.